US011394646B2

(12) United States Patent
Geng et al.

(10) Patent No.: US 11,394,646 B2
(45) Date of Patent: Jul. 19, 2022

(54) PACKET SENDING METHOD, NETWORK NODE, AND SYSTEM

(71) Applicant: Huawei Technologies Co., Ltd., Shenzhen (CN)

(72) Inventors: Xuesong Geng, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/094,529

(22) Filed: Nov. 10, 2020

(65) Prior Publication Data

US 2021/0058322 A1 Feb. 25, 2021

Related U.S. Application Data

(63) Continuation of application No. PCT/CN2019/085607, filed on May 6, 2019.

(30) Foreign Application Priority Data

May 11, 2018 (CN) .......................... 201810448408.3

(51) Int. Cl.
*H04L 12/741* (2013.01)
*H04L 45/74* (2022.01)
(Continued)

(52) U.S. Cl.
CPC .............. *H04L 45/74* (2013.01); *H04L 47/24* (2013.01); *H04L 47/28* (2013.01)

(58) Field of Classification Search
None
See application file for complete search history.

(56) References Cited

U.S. PATENT DOCUMENTS 6,747,972 B1 * 6/2004 Lenoski ................ H04L 45/302
370/394
2013/0205037 A1 * 8/2013 Biswas ................. H04L 47/193
709/232
(Continued)

FOREIGN PATENT DOCUMENTS

CN 1321026 A * 11/2001 ......... H04L 12/6418
CN 105577547 A * 5/2016
(Continued)

OTHER PUBLICATIONS

J. Farkas et al., DetNet Flow Information Model;draft-ietf-detnet-flow-information-model-00, IETF, Jan. 8, 20181 22 pages, XP15125097A.
(Continued)

*Primary Examiner* — Eunsook Choi
(74) *Attorney, Agent, or Firm* — Conley Rose, P.C.

(57) ABSTRACT

A packet sending method, a network node, and a system, where a controller obtains a forwarding latency requirement of a service flow and a destination address of the service flow, determines a forwarding path that meets the forwarding latency requirement, and determines a number of a first cycle time in which an ingress node forwards a packet and a number of a second cycle time in which an intermediate node forwards the packet. The controller sends a first entry to the ingress node. The first entry includes a sequence number of the packet and the first cycle time number. The controller sends a second entry to the intermediate node. The second entry includes the sequence number of the packet and the second cycle time number.

20 Claims, 10 Drawing Sheets

(51) Int. Cl.
*H04L 47/24* (2022.01)
*H04L 47/28* (2022.01)
*H04L 12/841* (2013.01)

(56) References Cited

U.S. PATENT DOCUMENTS

2017/0280357 A1 9/2017 Finn
2019/0199642 A1 6/2019 Jiang

FOREIGN PATENT DOCUMENTS

| CN | 105763451 A | * | 7/2016 | |
|---|---|---|---|---|
| CN | 105848238 A | | 8/2016 | |
| CN | 107248960 A | | 10/2017 | |
| CN | 107786465 A | | 3/2018 | |
| EP | 2149999 A1 | * | 2/2010 | ............ H04J 3/0632 |
| JP | 2005045409 A | * | 2/2005 | ............ H04L 1/0061 |
| JP | 2017028616 A | * | 2/2017 | ............. H04L 45/70 |
| WO | WO-0159979 A2 | * | 8/2001 | ............ H04L 1/1809 |
| WO | WO-2017041107 A1 | * | 3/2017 | ......... H04L 43/0829 |

OTHER PUBLICATIONS

Ahmed Nasrallah et al., Ultra-Low Latency (ULL) Networks: The IEEE TSN and IETF DetNet Standards and Related 5G ULL Research, arxiv.org, Sep. 2018, 59 pages, XP081550814.
The Time Sensitive Networking Task Group of IEEE 802.1, IEEE P802.1 Qch/D1.0, Draft Standard for Local and Metropolitan Area Networks Bridges and Bridged Networks Amendment: Cyclic Queuing and Forwarding, Aug. 11, 2016, 24 pages, XP068109345.

* cited by examiner

First entry

| Flow ID | Sequence Num | Cycle Num |
|---|---|---|
| Flow 1 | 0001 | Cycle 1 |
| Flow 1 | 0002 | Cycle 3 |
| Flow 1 | 0003 | Cycle 5 |

Second entry

| Flow ID | Sequence Num | Cycle Num |
|---|---|---|
| Flow 1 | 0001 | Cycle 3 |
| Flow 1 | 0002 | Cycle 5 |
| Flow 1 | 0003 | Cycle 7 |

FIG. 4

PACKET SENDING METHOD, NETWORK NODE, AND SYSTEM

CROSS-REFERENCE TO RELATED APPLICATIONS

This application is a continuation of International Patent Application No. PCT/CN2019/085607 filed on May 6, 2019, which claims priority to Chinese Patent Application No. 201810448408.3 filed on May 11, 2018. The disclosures of the aforementioned applications are hereby incorporated by reference in their entireties.

TECHNICAL FIELD

The present disclosure relates to the communications field, and in particular, to a packet sending method, a network node, and a system.

BACKGROUND

Deterministic Networking (DetNet) can provide a highly reliable path for an application. The DetNet can provide a bounded latency guarantee and ensure an ultra-low packet loss rate. The bounded latency guarantee means that in an end-to-end packet forwarding process, a packet forwarding latency is within a fixed and required range. That is, the packet forwarding latency needs to be within the latency range. A bounded latency is implemented using end-to-end reserved bandwidth resources and a queue management algorithm. Cyclic Queuing and Forwarding (CQF) is a queue management method that is applied to the DetNet in other approaches. According to a core of the CQF technology, a packet is sent in a cycle time of a node on a forwarding path, is received in a same cycle time of a next-hop node of the node, and is sent in a next cycle time of the next-hop node. Therefore, a maximum latency per hop is one cycle time, and a maximum end-to-end latency is (N+1)×cycle time, where N is a quantity of intermediate nodes on the forwarding path that the packet passes through. However, because there is a link latency, the packet may be sent in an $n^{th}$ cycle time of a node, and may be received in an $(n+1)^{th}$ cycle time of a next-hop node. Therefore, using the CQF, a deterministic latency guarantee cannot be accurately implemented during packet forwarding.

SUMMARY

This application provides a packet sending method, a network node, and a system, to accurately implement a latency guarantee during packet forwarding.

According to a first aspect, an embodiment of the present disclosure provides a packet sending method. The method includes obtaining, by a controller, a forwarding latency requirement of a service flow and a destination address of the service flow, and determining, based on the forwarding latency requirement and the destination address, a forwarding path for forwarding the service flow, where a latency of the forwarding path meets the forwarding latency requirement of the service flow, the forwarding path passes through a first network node and a second network node, the first network node is an ingress node on the forwarding path, and the second network node is an intermediate node on the forwarding path, determining, by the controller, a number of a first cycle time in which the first network node forwards a packet and a number of a second cycle time in which the second network node forwards the packet, where the packet is a packet in the service flow, generating, by the controller, a first entry and a second entry, where the first entry includes a correspondence between a sequence number of the packet and the first cycle time number, and the second entry includes a correspondence between the sequence number of the packet and the second cycle time number, sending, by the controller, the first entry to the first network node, where the first entry is used to indicate the first network node to send the packet in a time period corresponding to the first cycle time number, and sending, by the controller, the second entry to the second network node, where the second entry is used to indicate the second network node to send the packet in a time period corresponding to the second cycle time number.

According to the foregoing technical solution, the controller determines the forwarding path based on the forwarding latency requirement of the service flow, and separately determines a cycle time number corresponding to a forwarding time point of the ingress node on the forwarding path and a cycle time number corresponding to a forwarding time point of the intermediate node on the forwarding path. Then, the controller sends, to the ingress node and the intermediate node on the forwarding path, a cycle time number, including a packet sequence number, corresponding to a packet sending time point. In this way, the ingress node and the intermediate node on the forwarding path may send a packet corresponding to the sequence number in a time period corresponding to a corresponding cycle time number, to implement a deterministic latency guarantee during packet forwarding.

In a possible design, the controller obtains a node latency of the first network node and a node latency of the second network node, and the node latency includes a packet processing latency and a packet sending latency. The controller obtains a link latency of a link on the forwarding path. That the latency of the forwarding path meets a forwarding latency requirement of the packet includes a sum of the node latency of the first network node, the node latency of the second network node, and the link latency of the link on the forwarding path falls within a range of the forwarding latency requirement of the packet.

In a possible design, the controller obtains duration of a cycle time of the first network node and duration of a cycle time of the second network node. The controller obtains a third cycle time number of the first network node and a fourth cycle time number of the second network node that correspond to a current time of the controller. The controller determines the first cycle time number based on the duration of the cycle time of the first network node and the third cycle time number. The controller determines the second cycle time number based on the duration of the cycle time of the first network node, a latency of a link from the first network node to the second network node, the packet processing latency of the second network node, the fourth cycle time number, and the duration of the cycle time of the second network node.

In a possible design, the controller determines a first adjacent segment identifier of the first network node and a second adjacency segment identifier of the second network node. The controller generates a label stack, and the label stack includes the first adjacency segment identifier and the second adjacency segment identifier. The controller sends the label to the first network node, and the label stack is used to indicate the first network node to forward the packet through the forwarding path.

In a possible design, the controller sends information about the forwarding path to the first network node, to trigger the first network node to generate, based on the information about the forwarding path, a label switched path corresponding to the forwarding path. The label switched path is used to forward the packet.

In a possible design, the first entry and the second entry each further include a flow identifier of the service flow.

According to a second aspect, an embodiment of the present disclosure provides a packet sending method. The method includes obtaining, by a first network node, a forwarding latency requirement of a service flow and a destination address of the service flow, obtaining, by the first network node based on the forwarding latency requirement and the destination address of the service flow, a forwarding path for forwarding the service flow, where a latency of the forwarding path meets the forwarding latency requirement of the service flow, the first network node is an ingress node on the forwarding path, and a second network node is an intermediate node on the forwarding path, obtaining, by the first network node, a first entry, where the first entry includes a correspondence between a sequence number of a packet and a number of a first cycle time in which the first network node forwards the packet, and the packet is a packet in the service flow, and sending, by the first network node based on the first entry, the packet to the second network node in a time period corresponding to the cycle time number.

According to this technical solution, the first network node obtains, based on the forwarding latency requirement and the destination address of the service flow, the forwarding path for forwarding the service flow, and obtains the entry including the correspondence between the sequence number of the packet and the number of the first cycle time in which the first network node forwards the packet. Then, the first network node sends the packet corresponding to the sequence number to a next hop of the first network node in a time period corresponding to the first cycle time number such that the first network node sends the packet externally at a determined time point, to implement a deterministic latency guarantee during packet forwarding.

In a possible design, obtaining, by the first network node based on the forwarding latency requirement and the destination address of the service flow, a forwarding path for forwarding the service flow includes calculating, by the first network node, the forwarding path based on the forwarding latency requirement and the destination address of the service flow.

In a possible design, the first network node generates a second entry, and the second entry includes a correspondence between the sequence number of the packet and a number of a second cycle time in which the second network node forwards the packet. The first network node sends the second entry to the second network node, and the second entry is used to indicate the second network node to send the packet in a time period corresponding to the second cycle time number.

In a possible design, obtaining, by the first network node based on the forwarding latency requirement and the destination address of the service flow, a forwarding path for forwarding the service flow includes sending, by the first network node, the forwarding latency requirement and the destination address to a controller, to trigger the controller to determine the forwarding path based on the forwarding latency requirement and the destination address, and generate the first entry, and receiving, by the first network node, the first entry and information about the forwarding path that are sent by the controller.

In a possible design, the first network node obtains a second entry from the controller, and the second entry includes a correspondence between the sequence number of the packet and a number of a second cycle time in which the second network node forwards the packet. The first network node sends the second entry to the second network node, and the second entry is used to indicate the second network node to send the packet in a time period corresponding to the second cycle time number.

In a possible design, the information about the forwarding path includes address information of a node on the forwarding path. The method further includes generating through triggering based on the address information of the node on the forwarding path, by the first network node, a label switched path corresponding to the forwarding path, where the label switched path is used to forward the packet.

In a possible design, the information about the forwarding path is a label stack corresponding to the forwarding path, the label stack includes an adjacency segment identifier of the first network node and an adjacency segment identifier of the second network node, and the label stack is used to indicate the first network node to forward the packet through the forwarding path.

In a possible design, sending, by the first network node based on the first entry, the packet to the second network node in a time period corresponding to the cycle time number includes adding, by the first network node after the first network node matches the first entry based on the sequence number of the packet, the packet to a packet queue corresponding to the cycle time number, and sending the packet to the second network node when the packet queue is a sending queue.

In a possible design, the first network node receives a node latency of the second network node, where the node latency includes a packet processing latency and a packet sending latency, the first network node obtains a link latency of a link on the forwarding path, and that the latency of the forwarding path meets a forwarding latency requirement of the packet includes a sum of the node latency of the first network node, the node latency of the second network node, and the link latency of the link on the forwarding path falls within a range of the forwarding latency requirement of the packet.

In a possible design, the first network node determines duration of a cycle time of the first network node, and obtains duration of a cycle time of the second network node, the first network node determines a third cycle time number of the first network node and a fourth cycle time number of the second network node that correspond to a current time, the first network node determines the first cycle time number based on the duration of the cycle time of the first network node and the third cycle time number, and the first network node determines the second cycle time number based on the duration of the cycle time of the first network node, a latency of a link from the first network node to the second network node, the packet processing latency of the second network node, the fourth cycle time number, and the duration of the cycle time of the second network node.

According to a third aspect, an embodiment of the present disclosure provides a packet sending method. The method includes obtaining, by a second network node, an entry including a correspondence between a sequence number and a cycle time number, where the sequence number is a packet sequence number, and the cycle time number is used to indicate the second network node to send, in a time period corresponding to the cycle time number, a packet corresponding to the sequence number, receiving, by the second network node, a packet sent by a first network node, where the packet includes a flow identifier and the sequence number, and after matching the entry based on a sequence number included in the packet, sending, by the second network node, the packet to a next-hop network node of the second network node in a time period corresponding to the cycle time number.

According to this solution, an intermediate node on a forwarding path matches the entry based on the sequence number of the packet, and then sends the packet to the next-hop network node in the time period corresponding to the cycle time number included in the entry such that the intermediate node on the forwarding path sends the packet externally at a determined time point, to implement a deterministic latency guarantee during packet forwarding.

In a possible design, obtaining, by a second network node, an entry including a correspondence between a sequence number and a cycle time number includes receiving, by the second network node, the entry sent by the first network node, or receiving, by the second network node, the forwarding entry sent by a controller.

In a possible design, sending, by the second network node, the packet to a next-hop network node of the second network node in a time period corresponding to the cycle time number includes adding, by the second network node, the packet to a packet queue corresponding to the cycle time number, and sending the packet to the next-hop network node of the second network node when the packet queue is a sending queue.

According to a fourth aspect, an embodiment of the present disclosure provides a controller, to perform the method in the first aspect or any one of the possible implementations of the first aspect. Further, the controller includes a unit configured to perform the method in the first aspect or any one of the possible implementations of the first aspect.

According to a fifth aspect, an embodiment of the present disclosure provides a first network node, to perform the method in the second aspect or any one of the possible implementations of the second aspect. Further, the first network node includes a unit configured to perform the method in the second aspect or any one of the possible implementations of the second aspect.

According to a sixth aspect, an embodiment of the present disclosure provides a second network node, to perform the method in the third aspect or any one of the possible implementations of the third aspect. Further, the second network node includes a unit configured to perform the method in the third aspect or any one of the possible implementations of the third aspect.

According to a seventh aspect, a controller is provided. The controller includes a processor, a network interface, and a memory. The memory may be configured to store program code. The processor is configured to invoke the program code in the memory to perform the method in the first aspect or any one of the possible implementations of the first aspect. For details, refer to detailed descriptions in the method example. Details are not described herein again.

According to an eighth aspect, a first network node is provided. The first network node includes a processor, a network interface, and a memory. The memory may be configured to store program code. The processor is configured to invoke the program code in the memory to perform the method in the second aspect or any one of the possible implementations of the second aspect. For details, refer to detailed descriptions in the method example. Details are not described herein again.

According to a ninth aspect, a second network node is provided. The second network node includes a processor, a network interface, and a memory. The memory may be configured to store program code. The processor is configured to invoke the program code in the memory to perform the method in the third aspect or any one of the possible implementations of the third aspect. For details, refer to detailed descriptions in the method example. Details are not described herein again.

According to a tenth aspect, a packet sending system is provided. The system includes the controller, the first network node, and the second network node provided in the foregoing aspects.

According to an eleventh aspect, a packet sending system is provided. The system includes the first network node and the second network node provided in the foregoing aspects.

According to a twelfth aspect, a computer storage medium is provided. The computer storage medium is configured to store a computer software instruction used by the foregoing network node or a controller, and the computer software instruction includes a program designed to perform the foregoing aspects.

According to a thirteenth aspect, a computer program product is provided. The computer program product includes an instruction, and when the instruction is run on a computer, the computer is enabled to perform the method in the foregoing aspects.

BRIEF DESCRIPTION OF DRAWINGS

FIG. 4 is a schematic diagram of a first entry and a second entry according to an embodiment of the present disclosure;

DESCRIPTION OF EMBODIMENTS

The following describes the embodiments of the present disclosure with reference to accompanying drawings.

Figure 1:
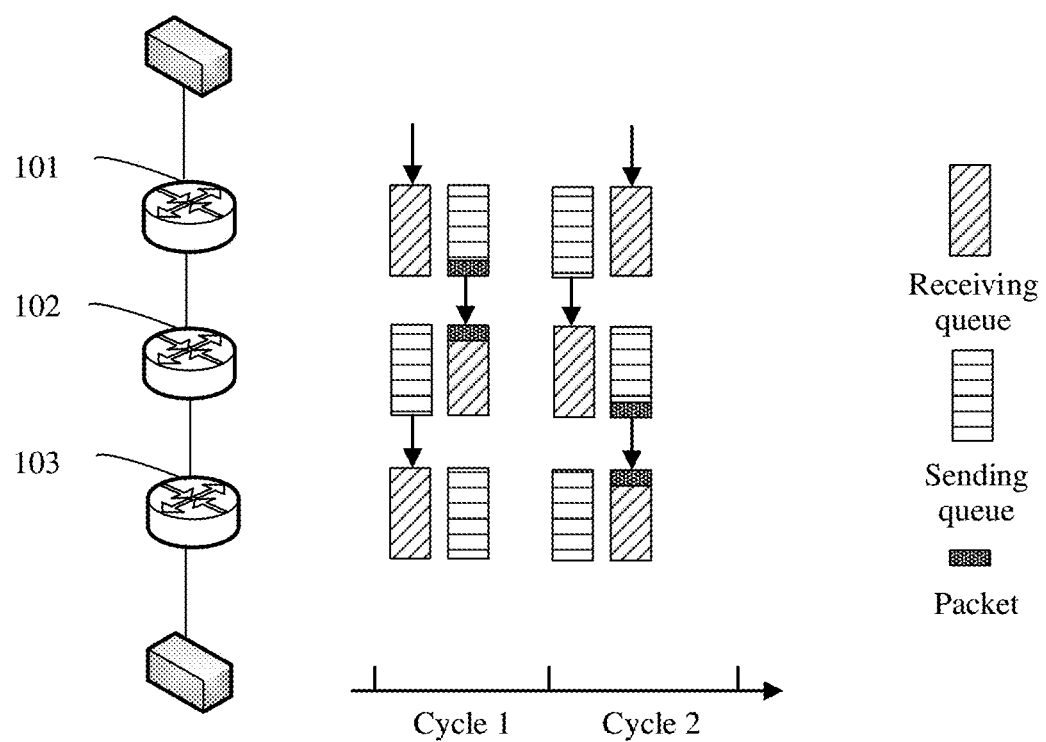
FIG. 1 is a schematic diagram in which CQF is used to forward a packet according to an embodiment of the present disclosure.

CQF is a queue management method that uses two queues to alternately send a packet. Each network node has an independent time period for sending the packet. Sufficient bandwidth is ensured for packets in a same time period through resource reservation, and packets in different time periods are isolated. The packet has a deterministic latency when being forwarded by each network node. As shown in FIG. 1, each network node has two packet queues: a packet receiving queue and a packet sending queue. The packet receiving queue is used to receive a packet sent by a previous-hop network node to a current network node. The packet sending queue is used to send a buffered packet to a next-hop network node. The packet receiving queue and the packet sending queue may be interchangeable. When the packet receiving queue is changed into the packet sending queue, a packet received by the packet receiving queue is sent to the next-hop network node. Each network node has a clock. After a fixed-duration time period, the packet receiving queue and the packet sending queue are interchanged. That is, the packet receiving queue is changed into the packet sending queue, and the packet sending queue is changed into the packet receiving queue. The fixed-duration time period is defined as a cycle time, which is referred to as a cycle for short. The network node records a time period in cycles. Cycle duration of each network node is the same, and a start time point and an end time point of cycles of different network nodes need to be the same. The packet receiving queue and the packet sending queue are interchanged at an interval of a cycle.

Referring to FIG. 1, FIG. 1 is a schematic diagram in which a network node uses CQF to forward a packet. In a cycle 1, a packet sending queue of a node 101 sends the packet to a packet receiving queue of a node 102. When the cycle 1 is changed into a cycle 2, the packet receiving queue of the node 102 is changed into a packet sending queue. In the cycle 2, the packet sending queue of the node 102 sends the packet to a packet receiving queue of a node 103. In a process in which the packet is forwarded from the node 101 to the node 103, a maximum packet forwarding latency is (N+1)×cycle, where N is a quantity of intermediate nodes on a forwarding path. In a scenario shown in FIG. 1, a packet forwarding latency of forwarding the packet from the node 101 to the node 103 is 2×cycle. Because impact of a link between nodes is not considered in a process of calculating the packet forwarding latency, a maximum packet forwarding latency obtained in this manner is inaccurate. For example, the packet is forwarded by the node 101 to the node 102 in the cycle 1. However, if a latency of a link between the node 101 and the node 102 is greater than duration of one cycle, it cannot be ensured that the packet is forwarded to the node 102 in the cycle 1. Therefore, using the CQF, a deterministic latency guarantee cannot be accurately implemented during packet forwarding.

Figure 2:
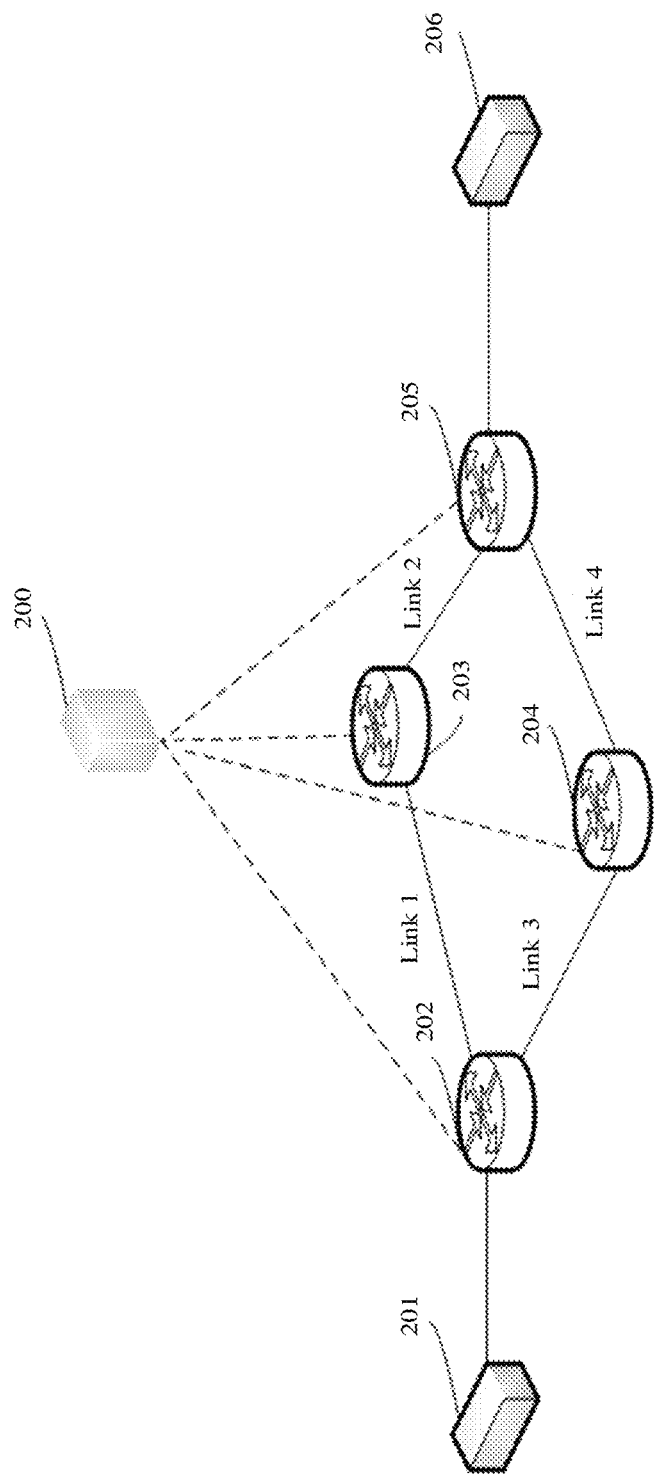
FIG. 2 is a schematic diagram of an application scenario of packet forwarding according to an embodiment of the present disclosure.

FIG. 2 is a schematic diagram of a network scenario of a packet sending method according to an embodiment of the present disclosure. The application scenario includes a controller 200, a transmit end 201, a receive end 206, a network node 202, a network node 203, a network node 204, and a network node 205. The controller 200 is a controller in a software-defined networking (SDN) architecture, and is configured to implement traffic control and manage a node in a network. In the scenario shown in FIG. 2, the controller 200 controls and manages the network node 202, the network node 203, the network node 204, and the network node 205. In a possible implementation, a network in which the network node 202, the network node 203, the network node 204, and the network node 205 are located is a segment routing (SR) network. The network node 202, the network node 203, the network node 204, and the network node 205 separately support an SR function. In another possible implementation, a network in which the network node 202, the network node 203, the network node 204, and the network node 205 are located is a Multiprotocol Label Switching (MPLS) network. The network node 202, the network node 203, the network node 204, and the network node 205 separately support MPLS forwarding. The transmit end 201 and the receive end 206 may be user devices, for example, a mobile phone or a personal computer. A link from the network node 202 to the network node 203 is a link 1, a link from the network node 203 to the network node 204 is a link 2, a link from the network node 202 to the network node 204 is a link 3, and a link from the network node 204 to the network node 205 is a link 4. In this embodiment of the present disclosure, the network node may be a specific network device, for example, a router or a switch.

Figure 3:
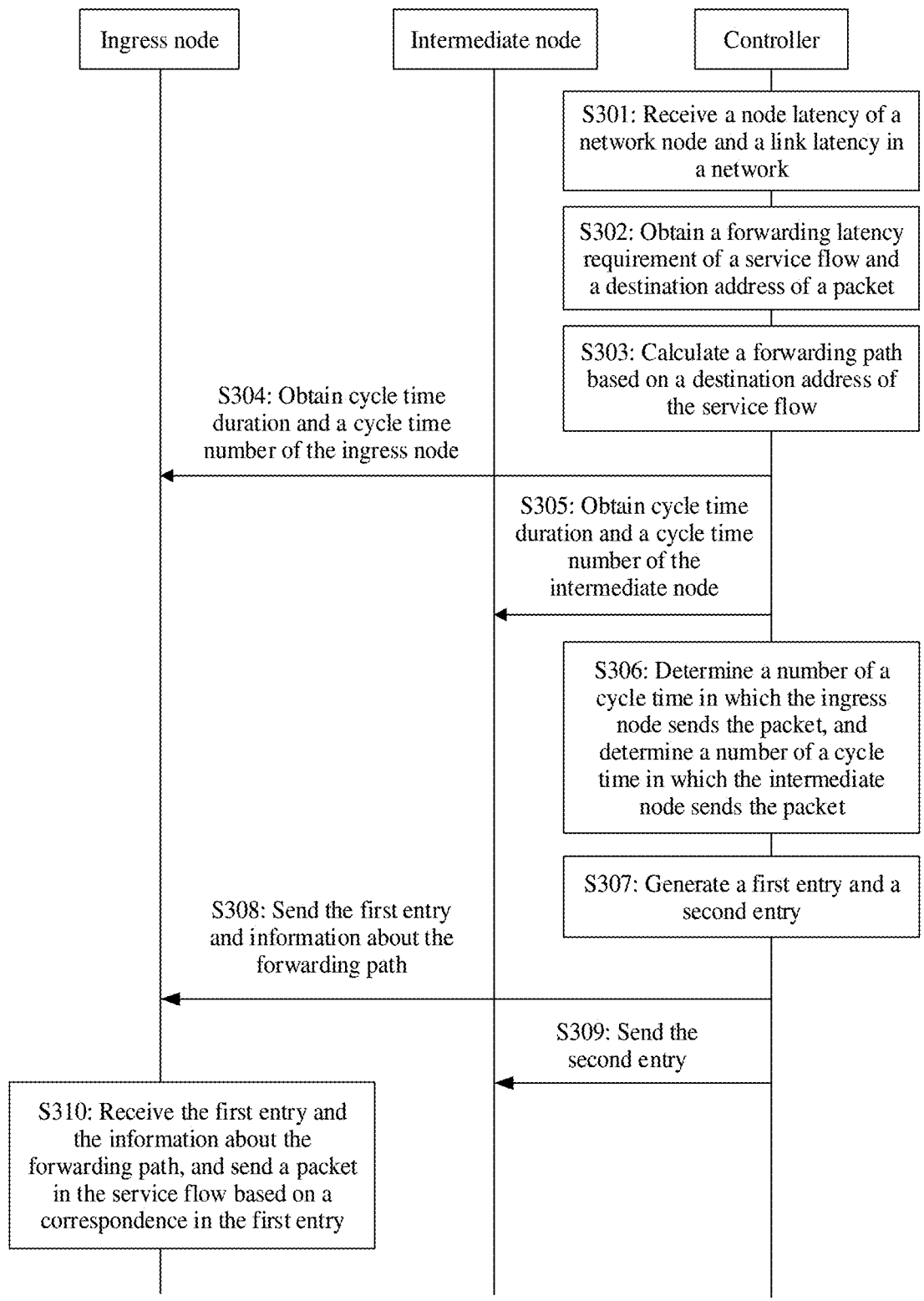
FIG. 3 is a schematic flowchart of packet forwarding according to an embodiment of the present disclosure.

With reference to the network scenario shown in FIG. 2, referring to FIG. 3, an embodiment of the present disclosure provides a packet sending method. The method includes the following steps.

S301: A controller receives a node latency of a network node and a link latency in a network. The node latency includes a packet processing latency and a packet sending latency of the node. The packet sending latency may also be referred to as a packet dequeuing latency. For example, the controller 200 separately receives a node latency of the network node 202, the network node 203, the network node 204, and the network node 205. The link latency includes a latency between network nodes in the network, for example, latencies of the link 1, the link 2, the link 3, and the link 4 in FIG. 2.

In an example, the packet processing latency of the network node is an average processing latency or a maximum processing latency of processed packets. The packet sending latency is an average sending latency or a maximum sending latency of packets sent by the network node. The link latency of the link 1 is an average forwarding latency or a maximum forwarding latency for forwarding a packet from the network node 202 to the network node 203. The link latency of the link 2 is an average forwarding latency or a maximum forwarding latency for forwarding a packet from the network node 203 to the network node 204. The link latency of the link 3 is an average forwarding latency or a maximum forwarding latency for forwarding a packet from the network node 202 to the network node 204. The link latency of the link 4 is an average forwarding latency or a maximum forwarding latency for forwarding a packet from the network node 204 to the network node 205.

S302: The controller obtains a forwarding latency requirement of a service flow and a destination address of the service flow. The service flow is a service flow that needs to be forwarded through a network managed by the controller. In the scenario shown in FIG. 2, a packet in the service flow needs to be forwarded through the network controlled and managed by the controller.

In an example, the forwarding latency requirement and the destination address of the service flow may be sent by an ingress node in the SR network to the controller. As shown in FIG. 2, the network node 202 sends, to the controller 200, the latency requirement and the destination address, of the service flow, required to be forwarded.

In an example, the forwarding latency requirement and the destination address of the service flow may be sent by the access end 201 to the controller. When the access end 201 needs to send the service flow through the network managed by the controller, the access end 201 sends the forwarding latency requirement and the destination address of the service flow to the controller.

In an example, the forwarding latency requirement of the service flow may be a latency range. For example, the latency requirement is that a packet forwarding latency ranges from 10 milliseconds (ms) to 15 ms. Alternatively, the forwarding latency requirement is a specific latency. For example, the forwarding latency is 20 ms.

S303: The controller calculates a forwarding path based on the destination address of the service flow, where a latency of the forwarding path meets the forwarding latency requirement of the service flow. The forwarding path includes an ingress node, an intermediate node, and an egress node. The latency of the forwarding path includes a node latency of the ingress node on the forwarding path, a node latency of the intermediate node on the forwarding path, and a link latency of a link from the ingress node to the egress node.

With reference to FIG. 2, for example, the destination address of the service flow is an address of the receive end 206, and the controller 200 calculates a forwarding path in the SR network based on the destination address. There are two paths that may reach the receive end 206: a path 1 and a path 2. The path 1 passes through the network node 202, the network node 203, and the network node 205. The path 2 passes through the network node 202, the network node 204, and the network node 205. If a latency of the path 1 meets the forwarding latency requirement of the service flow, and a latency of the path 2 does not meet the forwarding latency requirement of the service flow, the controller selects the path 1 as the forwarding path for forwarding the service flow. An ingress node on the path 1 is the network node 202, an intermediate node on the path 1 is the network node 203, and an egress node on the path 1 is the network node 205.

S304: The controller obtains duration of a cycle time of the ingress node on the forwarding path and a cycle time number of the ingress node at a current time point of the controller. In this embodiment of this application, the duration of the cycle time is a time length occupied by the cycle time. For example, the duration of the cycle time is 1 ms.

S305: The controller obtains duration of a cycle time of the intermediate node on the forwarding path and a cycle time number of the intermediate node at the current time point of the controller. There may be one or more intermediate nodes. The current time point of the controller is a time point at which the controller obtains the cycle time number of the intermediate node.

In this embodiment of this application, duration of a cycle time of each network node may be different or may be the same. The cycle time is a unit of process scheduling of the network node. A packet in a queue is sent within one cycle time. The cycle time of each network node is numbered from a time point at which the network node is started, and increases in ascending order. It can be seen that, in this embodiment of the present disclosure, the duration of the cycle time of each network node may be the same or different, and a start time point and an end time point of the cycle time of each network node may also be different. This avoids configuration complexity of the network node, simplifies device management, and improves packet forwarding efficiency.

With reference to FIG. 2, for example, the controller separately obtains duration of a cycle time of the network node 202 and duration of a cycle time of the network node 203. The duration of the cycle time of the network node 202 is first duration, for example, 10 ms. The duration of the cycle time of the network node 203 is second duration, for example, 12 ms. A current cycle time number of the network node 202 is a first number, for example, 124. A current cycle time number of the network node 203 is a second number, for example, 156.

S306: The controller determines a number of a cycle time in which the ingress node sends a packet, and determines a number of a cycle time in which the intermediate node sends the packet, where the packet belongs to the service flow. Optionally, the packet may be the first packet in the service flow, or may be any packet in the service flow.

After obtaining the current cycle time number and the duration of the cycle time that are of the ingress node, the controller may select a time point to send the packet by the ingress node, and determine a cycle time number corresponding to the time point. For example, the current cycle time number of the ingress node is k, for example, k=1001. The duration of the cycle time is m, for example, m=10 ms. The controller selects to wait for t seconds and then enables the ingress node to start to send the packet, for example, t=50 seconds. In this case, the number L corresponding to the cycle time in which the packet is sent is calculated according to the following formula:

$$L=k+t\times 1000/m.$$

To be specific, L=1001+50×1000/10=6001.

The controller may calculate, based on a time point at which the time period t is calculated and a time point of the controller at which the ingress node forwards the packet, to obtain a needed value in the formula.

After determining the cycle time number of the ingress node, the controller determines the cycle time number of the intermediate node. The controller determines a cycle time number of the first intermediate node on the forwarding path. The first intermediate node is a next-hop node of the ingress node. As shown in FIG. 2, the node 202 is an ingress node, and the node 203 is a next-hop node of the node 202. The controller calculates the cycle time number of the first intermediate node in the following manner.

Duration t before the packet enqueues at the intermediate node is calculated according to the following formula:

$$t=t1+t2+t3,$$

where t1 is a time length when the packet is forwarded by the ingress node in the cycle time numbered L, t2 is a link latency of a link between the ingress node and the intermediate node, and t3 is a maximum packet processing latency of the intermediate node.

A number of a cycle time in which the packet enqueues at the intermediate node at a latest time point is calculated based on the duration t before the packet enqueues at the intermediate node.

The current cycle time number of the intermediate node is a, for example, a=2001. The duration of the cycle time is m, for example, m=20 ms. The calculated latest enqueuing duration t at the intermediate node is 20 seconds. In this case, a number B corresponding to a cycle time in which the intermediate node sends the packet is calculated according to the following formula:

$$B=a+t\times 1000/m=3001.$$

The controller calculates a cycle time number of an intermediate node (non-first intermediate node) other than the first intermediate node in the following manner.

Duration t before the packet enqueues at the non-first intermediate node is calculated according to the following formula:

$$t=t1+t2+t3+t4,$$

where t1 is the time length when the packet is forwarded by the ingress node in the cycle time numbered L, t2 is a link latency of a link between the ingress node and the non-first intermediate node, t3 is a maximum packet processing latency of the non-first intermediate node, and t4 is a sum of node latencies of intermediate nodes between the ingress node and the non-first intermediate node.

S307: The controller generates a first entry and a second entry, where the first entry includes a correspondence between a sequence number of the packet and a first cycle time number, and the second entry includes a correspondence between the sequence number of the packet and a second cycle time number.

In a possible design, the first entry and the second entry each include a flow identifier of the service flow. The flow identifier may be a quintuple or a flow label (FL) of the packet. The quintuple of the packet includes a source Internet Protocol (IP) address, a source port, a destination IP address, a destination port, and a transport layer protocol number of the packet. Correspondingly, the first entry includes the flow identifier of the service flow, the sequence number of the packet, and the first cycle time number. The second entry includes the flow identifier of the service flow, the sequence number of the packet, and the second cycle time number.

In an example, the first entry and the second entry each may include a plurality of correspondences. As shown in FIG. 4, the first entry and the second entry each include three fields: a flow identifier (Flow ID), a sequence number (Sequence Num), and a cycle number (Cycle Num). The first entry includes three correspondences: a correspondence between a flow identifier Flow 1, a packet sequence number 0001, and a cycle number Cycle 1; a correspondence between the flow identifier Flow 1, a packet sequence number 0002, and a cycle number Cycle 3; and a correspondence between the flow identifier Flow 1, a packet sequence number 0003, and a cycle number Cycle 5. The second entry includes three correspondences: a correspondence between the flow identifier Flow 1, the packet sequence number 0001, and the cycle number Cycle 3; a correspondence between the flow identifier Flow 1, the packet sequence number 0002, and the cycle number Cycle 5; and a correspondence between the flow identifier Flow 1, the packet sequence number 0003, and a cycle number Cycle 7.

S308: The controller sends the first entry and information about the forwarding path to a first network node, where the first entry is used to indicate the first network node to send the packet in a time period corresponding to the first cycle time number.

S309: The controller sends the second entry to a second network node, where the second entry is used to indicate the second network node to send the packet in a time period corresponding to the second cycle time number.

In an example, the first network node and the second network node each support an SR function. The information about the forwarding path is a label stack, and the label stack includes a first adjacency segment identifier of the first network node and a second adjacency segment identifier of the second network node. The label stack is used to indicate the first network node to forward the packet through the forwarding path.

In an example, the information about the forwarding path includes an address of a network node on the forwarding path. The path information is used to trigger the first network node to generate, based on the information about the forwarding path, a label-switched path (LSP) corresponding to the forwarding path. The label switched path is used to forward the packet. For example, the first network node uses, based on the address of the network node on the path, Resource Reservation Protocol (RSVP) or MPLS to generate, through triggering, the LSP corresponding to the forwarding path.

S310: The ingress node receives the first entry and the information about the forwarding path that are sent by the controller. The ingress node forwards the packet in the service flow based on the correspondence in the first entry.

For example, the ingress node determines, based on the first entry shown in FIG. 4, that a packet whose sequence number is 0001 in a service flow whose corresponding service flow identifier is Flow 1 needs to be forwarded in a cycle time whose number is Cycle 1. After determining the number of the cycle time in which the service packet is sent, the ingress node adds the packet to a packet queue corresponding to the cycle time number. The packet queue is a packet receiving queue. When the packet queue is changed into a packet sending queue, the ingress node forwards the packet to the intermediate node. Based on the first entry shown in FIG. 4, the ingress node forwards a packet whose packet sequence number is 0002 in the service flow in a cycle time whose number is Cycle 3, and forwards a packet whose packet sequence number is 0003 in the service flow in a cycle time whose number is Cycle 5. Based on the second entry shown in FIG. 4, the intermediate node forwards the packet whose packet sequence number is 0001 in the service flow in the cycle time whose number is Cycle 3, forwards the packet whose packet sequence number is 0002 in the service flow in the cycle time whose number is Cycle 5, and forwards the packet whose packet sequence number is 0003 in the service flow in a cycle time whose number is Cycle 7.

In an example, the ingress node may determine, based on the first entry, a number of a cycle time in which a packer that is after the packet whose packet sequence number is 0003 is forwarded. The cycle time number is an arithmetic progression whose tolerance is 2 and whose first item is cycle 5. For example, the ingress node determines that a number of a cycle time in which a to-be-forwarded packet whose packet sequence number is 0004 is Cycle 5+2, namely, Cycle 7. The ingress node determines that a number of a cycle time in which a to-be-forwarded packet whose packet sequence number is 0005 is Cycle 9. Based on a same manner, the intermediate node may determine, based on the second entry, a number of a cycle time in which a packer that is after the packet whose packet sequence number is 0003 is forwarded. The cycle time number is an arithmetic progression whose tolerance is 2 and whose first item is Cycle 7.

In an example, the information about the forwarding path includes the address of the network node on the forwarding path. The first network node generates, based on the information about the forwarding path, the LSP corresponding to the forwarding path, and forwards the packet in the service flow through the label switched path.

In an example, before forwarding a packet based on the first entry shown in FIG. 4, the ingress node adds, to the label stack or an inlabel corresponding to the forwarding path, a header of the packet whose sequence number is 0001 in the service flow whose service flow identifier is Flow 1.

In an example, after the ingress node adds the packet to the packet queue corresponding to the cycle time, when the packet queue is the sending queue, the ingress node forwards the packet to the intermediate node using the sending queue.

Figure 5:
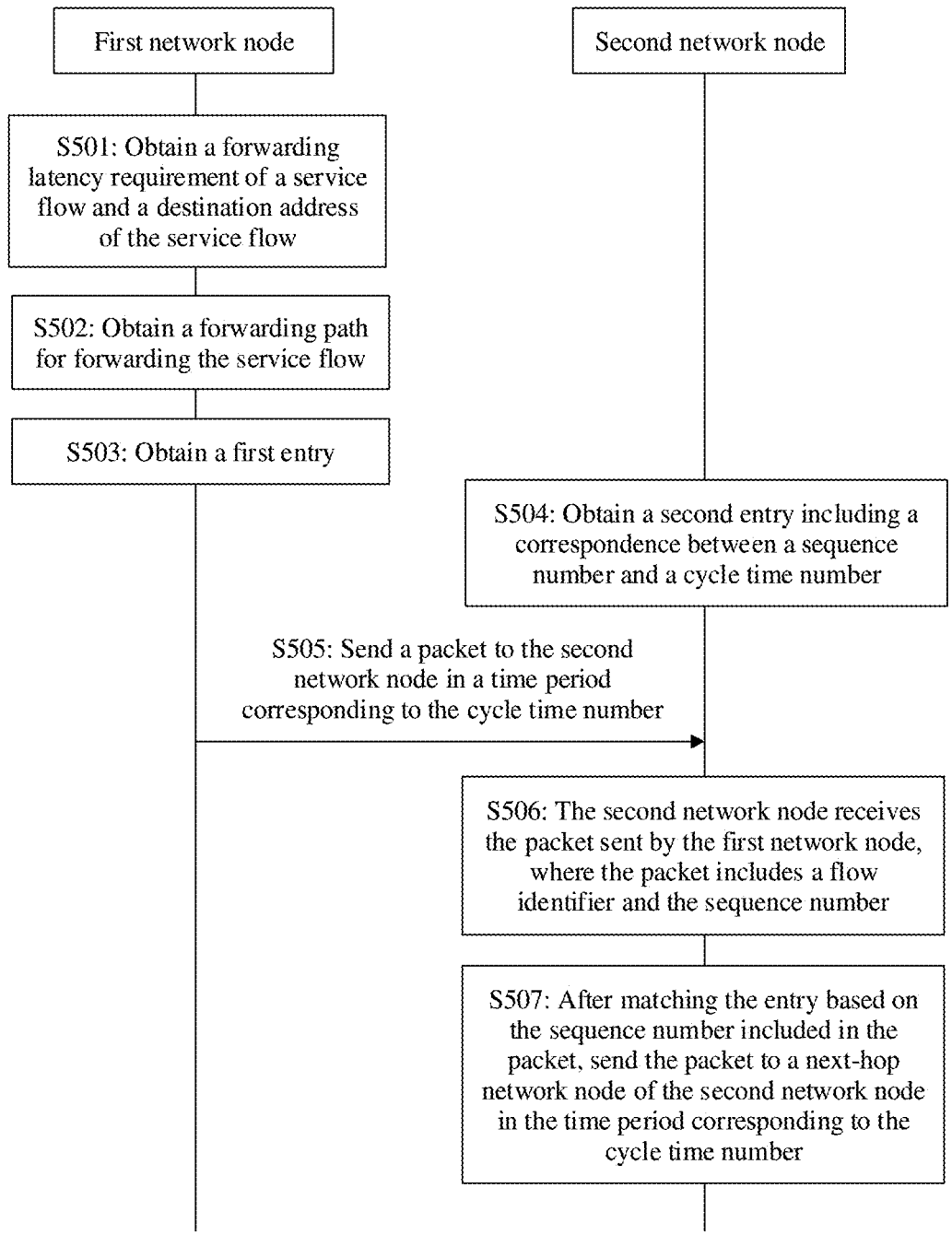
FIG. 5 is a schematic flowchart of packet forwarding according to an embodiment of the present disclosure.

With reference to the network scenario shown in FIG. 2, referring to FIG. 5, an embodiment of the present disclosure provides a packet sending method. When the method is applied to the network scenario shown in FIG. 2, the network scenario may include a controller 200, or may not include the controller 200. The method includes the following steps.

S501: A first network node obtains a forwarding latency requirement of a service flow and a destination address of the service flow, where the first network node is an ingress node on a forwarding path, for example, the ingress node in the embodiment shown in FIG. 3.

S502: The first network node obtains, based on the forwarding latency requirement and the destination address of the service flow, the forwarding path for forwarding the service flow, where a latency of the forwarding path meets the forwarding latency requirement of the service flow, the first network node is the ingress node on the forwarding path, and a second network node is an intermediate node on the forwarding path.

S503: The first network node obtains a first entry, where the first entry includes a correspondence between a sequence number of a packet and a number of a first cycle time in which the first network node forwards the packet, and the packet is a packet in the service flow. For example, the intermediate node in the embodiment shown in FIG. 3.

S504: The second network node obtains a second entry including a correspondence between a sequence number and a cycle time number, where the sequence number is a packet sequence number, and the cycle time number is used to indicate the second network node to send, in a time period corresponding to the cycle time number, a packet corresponding to the sequence number.

S505: The first network node sends the packet to the second network node based on the first entry in a time period corresponding to the cycle time number.

S506: The second network node receives the packet sent by the first network node, where the packet includes a flow identifier and the sequence number.

In this embodiment of this application, step S505 may be performed before step S504, or may be performed after step S504. A sequence of the two steps is not limited in this embodiment of this application.

S507: After matching the second entry based on the sequence number included in the packet, the second network node sends the packet to a next-hop network node of the second network node in a time period corresponding to the cycle time number included in the second entry.

In an example, the first network node may perform the steps performed by the ingress node in the embodiment shown in FIG. 3. For detailed descriptions of the steps, refer to the embodiment shown in FIG. 3. The second network node may perform the steps performed by the intermediate node in the embodiment shown in FIG. 3. For detailed descriptions of the steps, refer to FIG. 3.

In an example, that the second network node obtains the entry including the correspondence between a sequence number and a cycle time number includes that the second network node receives the entry sent by the first network node, or the second network node receives the forwarding entry sent by the controller.

In an example, that the second network node sends the packet to the next-hop network node of the second network node in the time period corresponding to the cycle time number includes that the second network node adds the packet to a packet queue corresponding to the cycle time number, and sends the packet to the next-hop network node of the second network node when the packet queue is a sending queue.

In an example, that the first network node obtains, based on the forwarding latency requirement and the destination address of the service flow, the forwarding path for forwarding the service flow includes that the first network node calculates the forwarding path based on the forwarding latency requirement and the destination address of the service flow.

In an example, the first network node generates the second entry, where the second entry includes a correspondence between the sequence number of the packet and a number of a second cycle time in which the second network node forwards the packet, and the first network node sends the second entry to the second network node, where the second entry is used to indicate the second network node to send the packet in a time period corresponding to the second cycle time number.

In an example, that the first network node obtains, based on the forwarding latency requirement and the destination address of the service flow, the forwarding path for forwarding the service flow includes that the first network node sends the forwarding latency requirement and the destination address to the controller, to trigger the controller to determine, based on the forwarding latency requirement and the destination address, the forwarding path for forwarding the service flow, and generate the first entry, and the first network node receives the first entry and information about the forwarding path that are sent by the controller.

In an example, the information about the forwarding path includes address information of a node on the forwarding path, and the method further includes that the first network node generates, through triggering based on the address information of the node on the forwarding path, a label switched path corresponding to the forwarding path, where the label switched path is used to forward the packet.

In an example, the information about the forwarding path is a label stack corresponding to the forwarding path, the label stack includes an adjacency segment identifier of the first network node and an adjacency segment identifier of the second network node, and the label stack is used to indicate the first network node to forward the packet through the forwarding path.

In an example, that the first network node sends, based on the first entry, the packet to the second network node in the time period corresponding to the cycle time number includes, after the first network node matches the first entry based on the sequence number of the packet, the first network node adds the packet to a packet queue corresponding to the cycle time number, and sends the packet to the second network node when the packet queue is a sending queue.

In an example, the first network node determines duration of a cycle time of the first network node, and obtains duration of a cycle time of the second network node. The first network node determines a third cycle time number of the first network node and a fourth cycle time number of the second network node at a current time point. The first network node determines the first cycle time number based on the duration of the cycle time of the first network node and the third cycle time number. In addition, the first network node determines the second cycle time number based on the duration of the cycle time of the first network node, a latency of a link from the first network node to the second network node, a packet processing latency of the second network node, the fourth cycle time number, and the duration of the cycle time of the second network node. For a specific manner, refer to a manner in which the controller determines the first cycle time number and the second cycle time number in the embodiment shown in FIG. 3.

Figure 6:
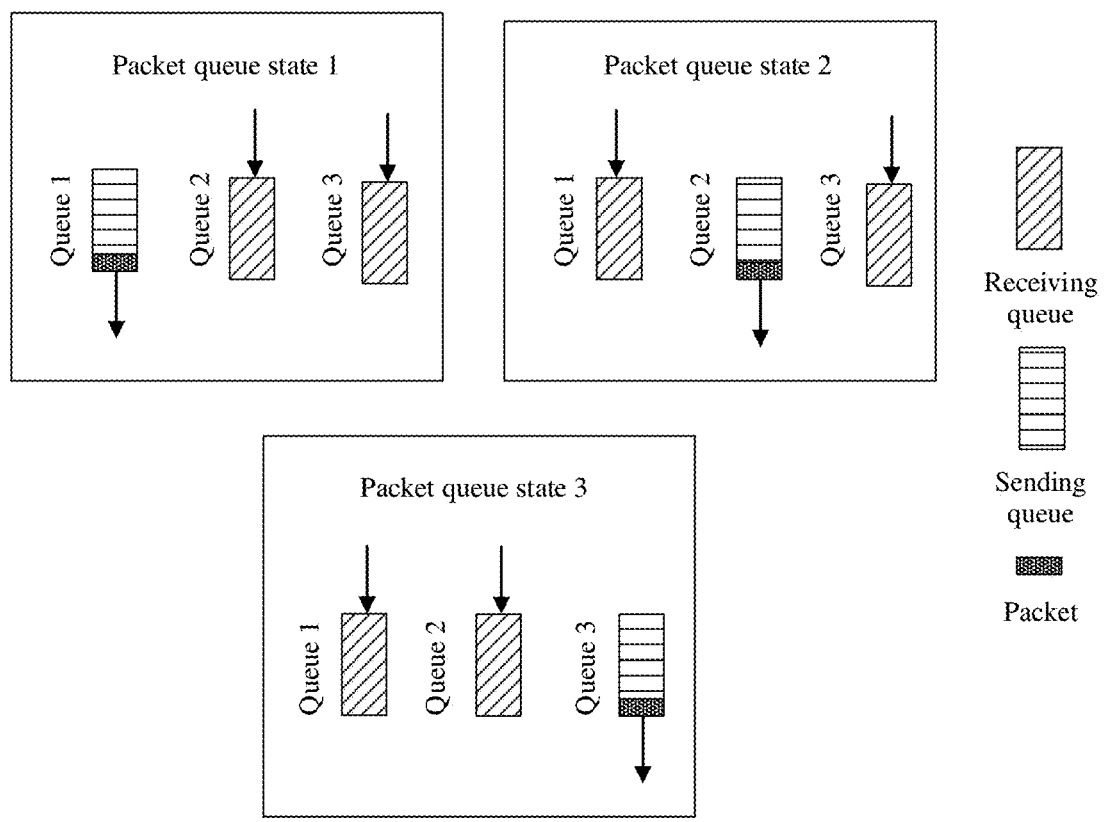
FIG. 6 is a schematic diagram of a packet queue according to an embodiment of the present disclosure.

In an example, an egress port of the first network node corresponds to three packet queues. Two packet queues are packet receiving queues, and one packet queue is a packet sending queue. Referring to FIG. 6, a packet queue of the first network node at a cycle time 1 is in a packet queue state 1, a packet queue at a cycle time 2 is in a packet queue state 2, and a packet queue at a cycle time 3 is in a packet queue state 3. In the packet queue state 1, a queue 1 is a sending queue, and a queue 2 and a queue 3 are packet receiving queues. In the packet queue state 2, the queue 2 is a sending queue, and the queue 1 and the queue 3 are packet receiving queues. In the packet queue state 3, the queue 3 is a sending queue, and the queue 1 and the queue 2 are packet receiving queues. A packet queue state is switched alternately between three states in FIG. 6. For example, the packet queue state 1 corresponds to a cycle time 1, 4, 7, 10, and the like. The packet queue state 2 corresponds to a cycle time 2, 5, 8, 11, and the like. The packet queue state 3 corresponds to a cycle time 3, 6, 9, 12, and the like. Each queue corresponds to a cycle time number. For example, the queue 1 corresponds to the cycle time 1, 4, 7, 10, and the like. The queue 2 corresponds to the cycle time 2, 5, 8, 11, and the like. The queue 3 corresponds to the cycle time 3, 6, 9, 12, and the like. That is, a sequence of the cycle time number corresponding to each queue is an arithmetic progression with a tolerance of 3. Correspondingly, when the first network node determines that a first packet is sent in the cycle time 5, and determines that a current cycle time number of the first network node is 4, the first network node further determines that a current packet queue is in the packet queue state 1. The first network node adds the packet to the packet queue 2. When the cycle time of the first network node is changed into the cycle time 5, the packet queue is in the state 2, and the packet is sent to the second network node using the packet queue 2.

In an example, an egress port of the second network node also corresponds to the three packet queues shown in FIG. 6, and a state change of the packet queue is shown in FIG. 6. When the second network node receives a packet in the cycle time 6 of the second network node, and determines, based on a sequence number of the packet, that the second network node needs to send the packet externally in the cycle time 8, the second network node adds the packet to the queue 2. In this case, the packet queue is in the state 3. When the cycle time number of the second network node is changed into 8 (that is, the packet queue is in the state 2), a state of the queue 2 is a packet sending state. The second network node sends the packet to the next-hop node of the second network node using the packet queue 2.

A plurality of packet queues is configured on the network node, to improve reliability of packet forwarding. For example, when the packet arrives at the second network node, a packet receiving queue of the second network node is full. In this case, queue overflow occurs, and the packet cannot be normally forwarded. A quantity of queues for receiving the packet is added such that the packet may be buffered when the packet arrives at the network node in advance. When a sending cycle time of the packet arrives, the packet is sent. This improves reliability of packet sending.

Figure 7:
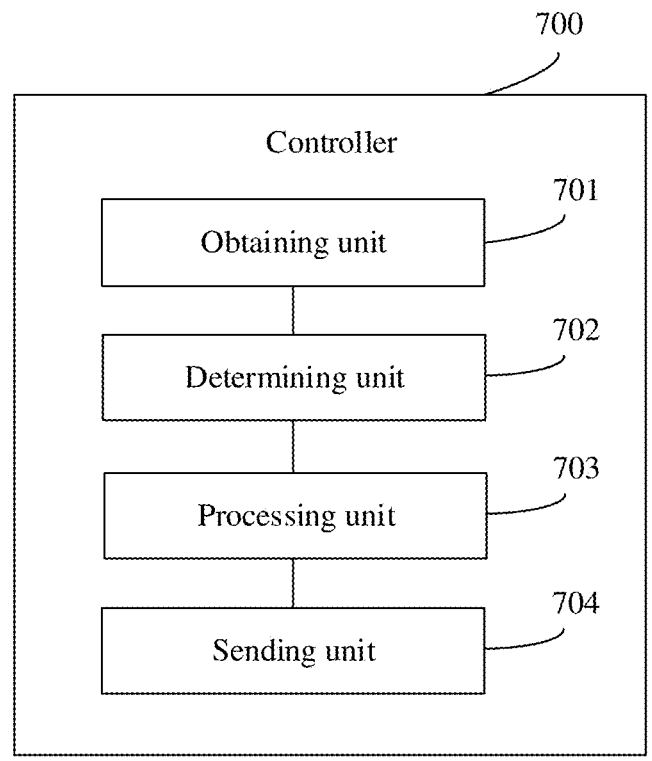
FIG. 7 is a schematic structural diagram of a controller according to an embodiment of the present disclosure.

FIG. 7 is a possible schematic structural diagram of the controller in the foregoing embodiments. The controller 700 may implement functions of the controller in the embodiment shown in FIG. 3 or FIG. 5. Referring to FIG. 7, the controller 700 includes an obtaining unit 701, a determining unit 702, a processing unit 703, and a sending unit 704. These units may perform corresponding functions of the controller in the foregoing method embodiments. The obtaining unit 701 is configured to support the controller 700 to perform processes in S301, S302, S304, and S305 in FIG. 3. The determining unit 702 is configured to support the controller 700 to perform processes in S303 and S306 in FIG. 3. The sending unit 704 is configured to support the controller 700 to perform processes in S308 and S309 in FIG. 3. The processing unit 703 is configured to support the controller 700 to perform a process in S307 in FIG. 3 and/or another process performed by the controller in the technology described in this specification. For example, the obtaining unit 701 is configured to perform various information obtaining performed by the node in the foregoing method embodiments. The determining unit 702 is configured to perform a determining action performed by the controller in the foregoing method embodiments. The sending unit 704 is configured to perform various information sending performed by the controller in the foregoing method embodiments. The processing unit 703 is configured to perform processing, other than the information receiving and sending and the determining action, performed by the controller in the foregoing method embodiments. For example, the obtaining unit 701 is configured to obtain a forwarding latency requirement of a service flow and a destination address of the service flow. The determining unit 702 is configured to determine, based on the forwarding latency requirement and the destination address, a forwarding path for forwarding the service flow, where a latency of the forwarding path meets the forwarding latency requirement of the service flow, the forwarding path passes through a first network node and a second network node, the first network node is an ingress node on the forwarding path, and the second network node is an intermediate node on the forwarding path. The determining unit 702 is configured to determine a number of a first cycle time in which the first network node forwards a packet and a number of a second cycle time in which the second network node forwards the packet, where the packet is a packet in the service flow. The processing unit 703 is configured to generate a first entry and a second entry, where the first entry includes a correspondence between a sequence number of the packet and the first cycle time number, and the second entry includes a correspondence between the sequence number of the packet and the second cycle time number. The sending unit 704 is configured to send the first entry to the first network node and send the second entry to the second network node, where the first entry is used to indicate the first network node to send the packet in a time period corresponding to the first cycle time number, and the second entry is used to indicate the second network node to send the packet in a time period corresponding to the second cycle time number. For a specific execution process, refer to detailed descriptions of corresponding steps in the embodiment shown in FIG. 3 or FIG. 5. Details are not described herein again.

Figure 8:
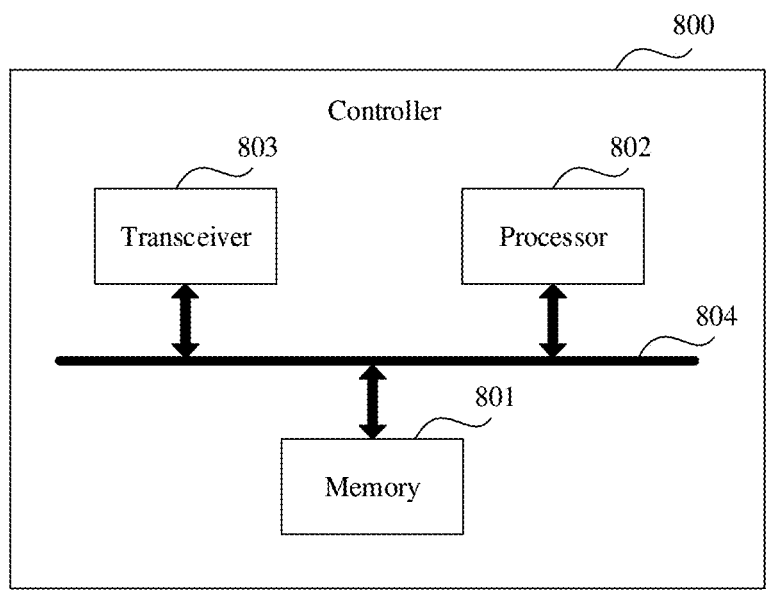
FIG. 8 is a schematic structural diagram of a controller according to an embodiment of the present disclosure.

FIG. 8 is a possible schematic structural diagram of a controller in the foregoing embodiments. The controller 800 includes a processor 802, a transceiver 803, a memory 801, and a bus 804. The processor 802, the transceiver 803, and the memory 801 are interconnected through the bus 804. The bus 804 may be a Peripheral Component Interconnect (PCI) bus, an Extended Industry Standard Architecture (EISA) bus, or the like. The bus may be classified into an address bus, a data bus, a control bus, and the like. For ease of indication, only one thick line is used to indicate the bus in FIG. 8. However, it does not indicate that there is only one bus or only one type of bus. The controller 800 may implement a function of the controller in the embodiment shown in FIG. 3 or FIG. 5. The processor 802 and the transceiver 803 may perform corresponding functions of the controller in the foregoing method examples. The transceiver 803 is configured to support the controller 800 to perform processes in S301, S302, S308, and S309 in FIG. 3. The processor 802 is configured to support the controller 800 to perform a process in S307 in FIG. 3 and/or another process performed by the controller in the technology described in this specification. The memory 801 is configured to store program code and data of the controller 800. For a specific execution process, refer to detailed descriptions of corresponding steps in the embodiment shown in FIG. 3 or FIG. 5. Details are not described herein again.

Figure 9:
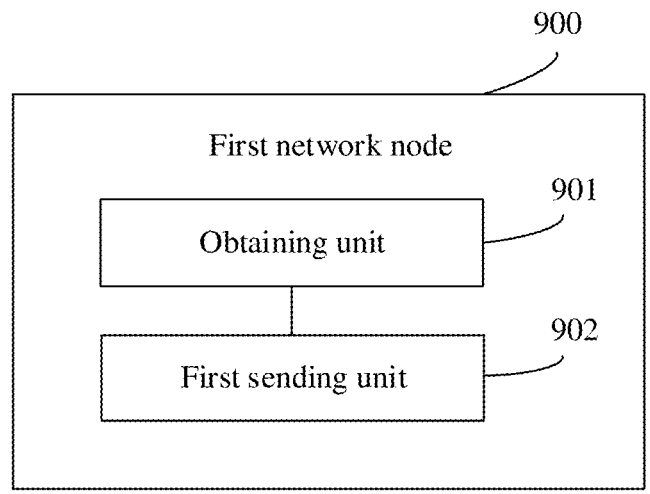
FIG. 9 is a schematic structural diagram of a first network node according to an embodiment of the present disclosure.

FIG. 9 is a possible schematic structural diagram of the first network node in the foregoing embodiments. The first network node may implement a function of the ingress node in the embodiment shown in FIG. 3 or a function of the first network node in the embodiment shown in FIG. 5. Referring to FIG. 9, the first network node 900 includes an obtaining unit 901 and a first sending unit 902. These units may perform corresponding functions of the first network node in the foregoing method examples. The obtaining unit 901 is configured to support the first network node 900 to perform processes in S501, S502, and S503 in FIG. 5. The first sending unit 902 is configured to support the first network node 900 to perform a process in S505 in FIG. 5. For example, the obtaining unit 901 is configured to perform various information obtaining performed by the first network node in the foregoing method embodiments. The first sending unit 902 is configured to perform various information sending performed by the first network node in the foregoing method embodiments. For example, the obtaining unit 901 is configured to obtain a forwarding latency requirement of a service flow and a destination address of the service flow, obtain, based on the forwarding latency requirement and the destination address of the service flow, a forwarding path for forwarding the service flow, where a latency of the forwarding path meets the forwarding latency requirement of the service flow, the first network node is an ingress node on the forwarding path, and a second network node is an intermediate node on the forwarding path, and obtain a first entry, where the first entry includes a correspondence between a sequence number of a packet and a number of a first cycle time in which the first network node forwards the packet, and the packet is a packet in the service flow. The first sending unit 902 is configured to send the packet to the second network node based on the first entry in a time period corresponding to the cycle time number. For a specific execution process, refer to detailed descriptions of corresponding steps in the embodiment shown in FIG. 3 or FIG. 5. Details are not described herein again.

It should be noted that, in the embodiments of the present disclosure, module division is an example, and is merely logical function division. In actual implementation, there may be another division manner. Functional units in the embodiments of the present disclosure may be integrated into one processing unit, or each of the units may exist alone physically, or two or more units are integrated into one unit. For example, in the foregoing embodiments, the receiving unit and the sending unit may be a same unit or different units. The integrated unit may be implemented in a form of hardware, or may be implemented in a form of a software functional unit.

Figure 10:
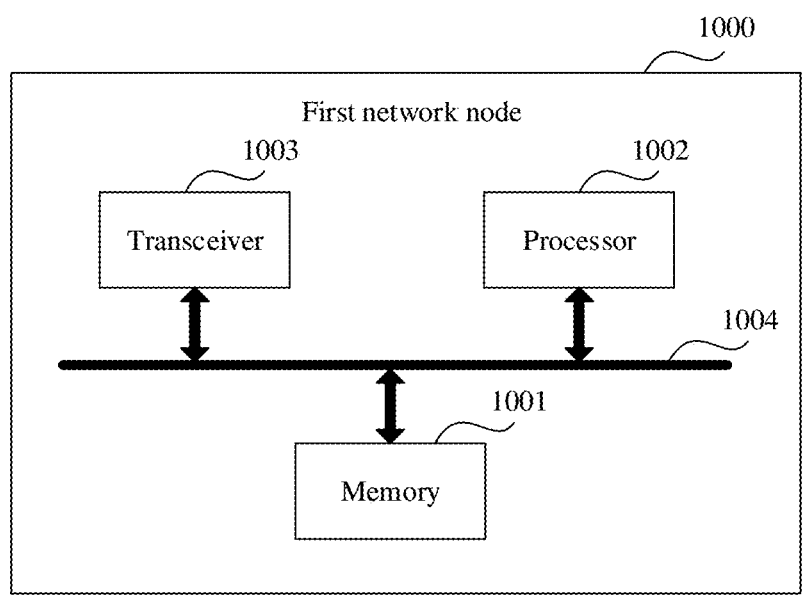
FIG. 10 is a schematic structural diagram of a first network node according to an embodiment of the present disclosure.

Referring to FIG. 10, a first network node 1000 includes a processor 1002, a transceiver 1003, a memory 1001, and a bus 1004. The transceiver 1003, the processor 1002, and the memory 1001 are interconnected through the bus 1004. The bus 1004 may be a PCI bus, an EISA bus, or the like. The bus may be classified into an address bus, a data bus, a control bus, and the like. For ease of indication, only one thick line is used to indicate the bus in FIG. 10. However, it does not indicate that there is only one bus or only one type of bus. The first network node 1000 may implement a function of the first network node or the ingress node in the embodiment shown in FIG. 3 or FIG. 5. The processor 1002 and the transceiver 1003 may perform corresponding functions of the first network node or the ingress node in the foregoing method examples. For a specific execution process, refer to detailed descriptions of corresponding steps in the embodiment shown in FIG. 3 or FIG. 5. Details are not described herein again.

Figure 11:
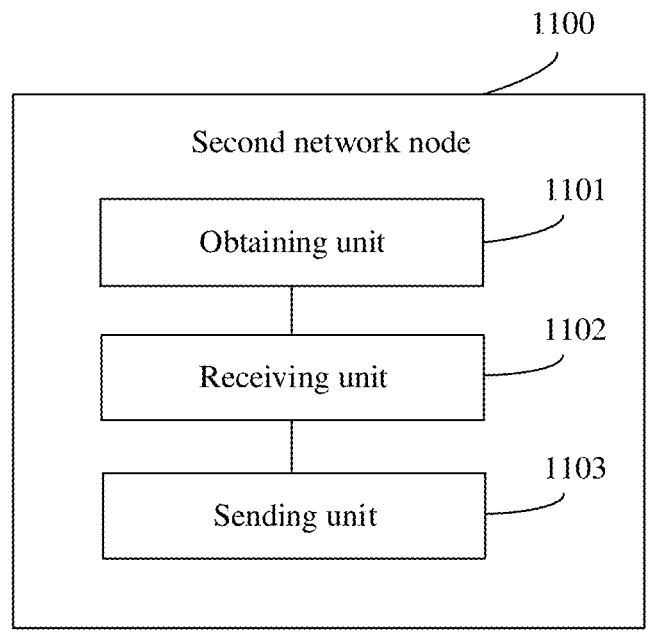
FIG. 11 is a schematic structural diagram of a second network node according to an embodiment of the present disclosure.

FIG. 11 is a possible schematic structural diagram of the second network node in the foregoing embodiments. The second network node may implement a function of the intermediate node in the embodiment shown in FIG. 3 or a function of the second network node in the embodiment shown in FIG. 5. Referring to FIG. 11, the second network node 1100 includes an obtaining unit 1101, a receiving unit 1102, and a sending unit 1103. These units may perform corresponding functions of the second network node or the intermediate node in the foregoing method examples. The obtaining unit 1101 is configured to support the second network node 1100 to perform a process in S504 in FIG. 5. The receiving unit 1102 is configured to support the second network node 1100 to perform processes in S505 and S506 in FIG. 5. The sending unit 1103 is configured to support the second network node 1100 to perform a process in S507 in FIG. 5. For example, the obtaining unit 1101 is configured to perform various information obtaining performed by the second network node in the foregoing method embodiments. The receiving unit 1102 is configured to perform various information receiving performed by the second network node in the foregoing method embodiments. The sending unit 1103 is configured to perform various information sending performed by the second network node in the foregoing method embodiments. For example, the obtaining unit 1101 is configured to obtain an entry including a correspondence between a sequence number and a cyclic period cycle time number, where the sequence number is a packet sequence number, and the cycle time number is used to indicate the second network node to send, in a time period corresponding to the cycle time number, a packet corresponding to the sequence number. The receiving unit 1102 is configured to receive a packet sent by a first network node, where the packet includes a flow identifier and the sequence number. The sending unit 1103 is configured to, after matching the entry based on a sequence number included in the packet, send the packet to a next-hop network node of the second network node in the time period corresponding to the cycle time number. For a specific execution process, refer to detailed descriptions of corresponding steps in the embodiment shown in FIG. 3 or FIG. 5. Details are not described herein again.

It should be noted that, in the embodiments of the present disclosure, module division is an example, and is merely logical function division. In actual implementation, there may be another division manner. Functional units in the embodiments of the present disclosure may be integrated into one processing unit, or each of the units may exist alone physically, or two or more units are integrated into one unit.

For example, in the foregoing embodiments, the receiving unit and the sending unit may be a same unit or different units. The integrated unit may be implemented in a form of hardware, or may be implemented in a form of a software functional unit.

Figure 12:
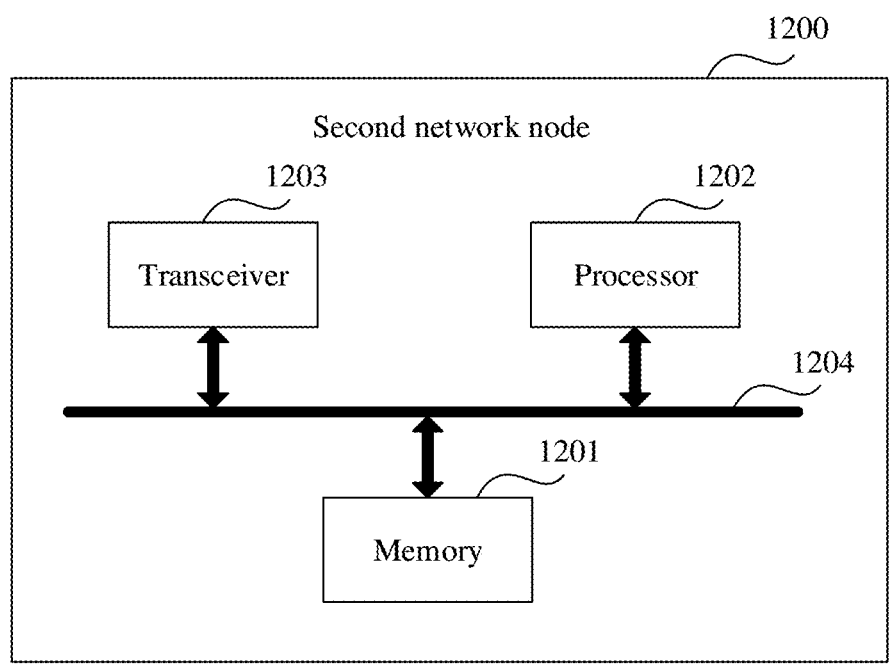
FIG. 12 is a schematic structural diagram of a second network node according to an embodiment of the present disclosure.

Referring to FIG. 12, a second network node 1200 includes a processor 1202, a transceiver 1203, a memory 1201, and a bus 1204. The transceiver 1203, the processor 1202, and the memory 1201 are interconnected through the bus 1204. The bus 1204 may be a PCI bus, an EISA bus, or the like. The bus may be classified into an address bus, a data bus, a control bus, and the like. For ease of indication, only one thick line is used to indicate the bus in FIG. 12. However, it does not indicate that there is only one bus or only one type of bus. The second network node 1200 may implement a function of the second network node or the intermediate node in the embodiment shown in FIG. 3 or FIG. 5. The processor 1202 and the transceiver 1203 may perform corresponding functions of the second network node or the intermediate node in the foregoing method examples. For a specific execution process, refer to detailed descriptions of corresponding steps in the embodiment shown in FIG. 3 or FIG. 5. Details are not described herein again.

Figure 13:
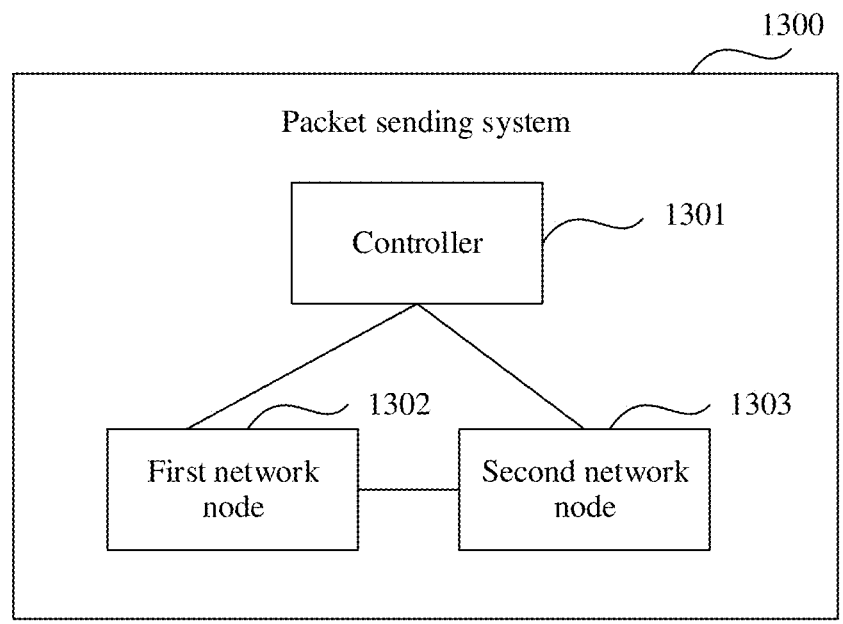
FIG. 13 is a schematic diagram of a packet forwarding system according to an embodiment of the present disclosure.

Referring to FIG. 13, an embodiment of the present disclosure provides a packet sending system 1300. The system 1300 is configured to implement the packet sending method in the foregoing method embodiments. The system 1300 includes a controller 1301, a first network node 1302, and a second network node 1303. The controller 1301, the first network node 1302, and the second network node 1303 may respectively implement functions of the controller, the first network node, and the second network node in the embodiment shown in FIG. 3 or FIG. 5. For a specific execution process, refer to detailed descriptions of corresponding steps in the embodiment shown in FIG. 3 or FIG. 5. Details are not described herein again.

Figure 14:
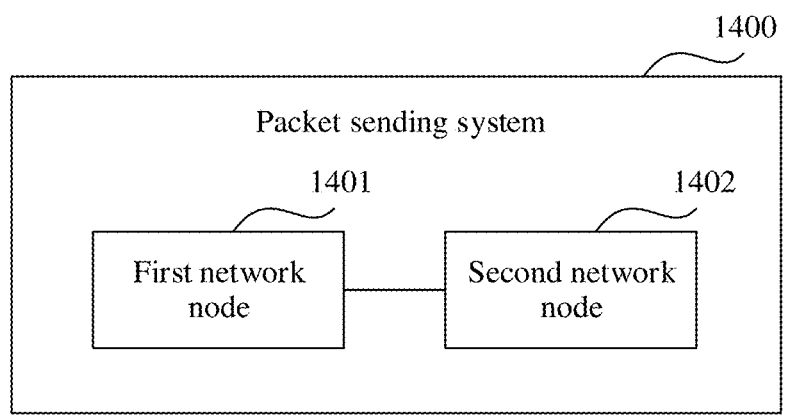
FIG. 14 is a schematic diagram of a packet forwarding system according to an embodiment of the present disclosure.

Referring to FIG. 14, an embodiment of the present disclosure provides a packet sending system 1400. The system 1400 is configured to implement the packet sending method in the foregoing method embodiments. The system 1400 includes a first network node 1401 and a second network node 1402. The first network node 1401 and the second network node 1402 may respectively implement functions of the first network node and the second network node in the embodiment shown in FIG. 5. For a specific execution process, refer to detailed descriptions of corresponding steps in the embodiment shown in FIG. 5. Details are not described herein again.

An embodiment of the present disclosure further provides a storage medium configured to store a software instruction used in the foregoing embodiments. The software instruction includes a program used to perform the method shown in the foregoing embodiments. When the program is executed on a computer or a device, the computer or the device is enabled to perform the method in the foregoing method embodiments.

"First" in the first network node in the embodiments of the present disclosure is merely used as a name identifier, and does not represent the first in sequence. This rule also applies to "second" and "third".

It should be noted that any apparatus embodiment described above is merely an example. The units described as separate parts may or may not be physically separate, and parts displayed as units may or may not be physical units, may be located in one position, or may be distributed on a plurality of network units. Some or all of the modules may be selected based on an actual requirement to achieve the objectives of the solutions in the embodiments. In addition, in the embodiment accompanying drawings of the first network node or the controller provided in the present disclosure, a connection relationship between modules indicates that the modules have a communication connection with each other, which may be further implemented as one or more communications buses or signal cables. A person of ordinary skill in the art may understand and implement the embodiments without creative efforts.

The methods or algorithm steps described with reference to the content disclosed in the embodiments of the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a hard disk, a removable hard disk, a compact disc, or any other form of storage medium well-known in the art. For example, a storage medium is coupled to a processor such that the processor can read information from the storage medium or write information into the storage medium. Certainly, the storage medium may be a component of the processor. The processor and the storage medium may be located in an application-specific integrated circuit (ASIC). In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the embodiments are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or special-purpose computer.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method implemented by a controller, wherein the method comprises:
   obtaining a forwarding latency requirement of a service flow and a destination address of the service flow;
   determining, based on the forwarding latency requirement and the destination address, a forwarding path for forwarding the service flow, wherein a first latency of the forwarding path meets the forwarding latency requirement, wherein the forwarding path passes through a first network node and a second network node, wherein the first network node is an ingress node on the forwarding path, and wherein the second network node is an intermediate node on the forwarding path;
determining a first cycle time number in which the first network node forwards a packet and a second cycle time number in which the second network node forwards the packet, wherein the packet is in the service flow;
generating a first entry and a second entry, wherein the first entry comprises a first correspondence between a sequence number of the packet and the first cycle time number, and wherein the second entry comprises a second correspondence between the sequence number and the second cycle time number;
sending the first entry to the first network node indicating to send the packet during a first time period corresponding to the first cycle time number; and
sending the second entry to the second network node indicating to send the packet during a second time period corresponding to the second cycle time number.

2. The method of claim 1, further comprising:
obtaining a first node latency of the first network node and a second node latency of the second network node, wherein the first node latency comprises a first packet processing latency and a first packet sending latency of the first network node, and wherein the second node latency comprises a second packet processing latency and a second packet sending latency of the second network node; and
obtaining a link latency of a link on the forwarding path, wherein the latency meets the forwarding latency requirement when a sum of the first node latency, the second node latency, and the link latency falls within a range of the forwarding latency requirement.

3. The method of claim 1, further comprising:
obtaining a first duration of a first cycle time of the first network node and a second duration of a second cycle time of the second network node;
obtaining a third cycle time number of the first network node and a fourth cycle time number of the second network node that correspond to a current time of the controller;
determining the first cycle time number based on the first duration and the third cycle time number; and
determining the second cycle time number based on the first duration, a second latency of a link from the first network node to the second network node, a second packet processing latency of the second network node, the fourth cycle time number, and the second duration.

4. The method of claim 1, further comprising:
determining a first adjacent segment identifier of the first network node and a second adjacency segment identifier of the second network node;
generating a label stack comprising the first adjacency segment identifier and the second adjacency segment identifier; and
sending the label stack to the first network node indicating to forward the packet through the forwarding path.

5. A method implemented by a first network node, wherein the method comprises:
obtaining a forwarding latency requirement of a service flow and a destination address of the service flow;
obtaining, based on the forwarding latency requirement and the destination address, a forwarding path for forwarding the service flow, wherein a first latency of the forwarding path meets the forwarding latency requirement, and wherein the first network node is an ingress node on the forwarding path;
obtaining a first entry comprising a first correspondence between a sequence number of a packet and a first cycle time number in which the first network node forwards the packet, wherein the packet is in the service flow; and
sending, based on the first entry, the packet to a second network node during a first time period corresponding to the first cycle time number,
wherein the second network node is an intermediate node on the forwarding path.

6. The method of claim 5, wherein obtaining the forwarding path comprises calculating the forwarding path based on the forwarding latency requirement and the destination address.

7. The method of claim 6, further comprising:
generating a second entry comprising a second correspondence between the sequence number and a second cycle time number in which the second network node forwards the packet; and
sending the second entry to the second network node indicating to send the packet during a second time period corresponding to the second cycle time number.

8. The method of claim 5, wherein obtaining the forwarding path comprises:
sending the forwarding latency requirement and the destination address to a controller instructing the controller to determine, based on the forwarding latency requirement and the destination address, the forwarding path and to generate the first entry; and
receiving, from the controller, the first entry and information about the forwarding path.

9. The method of claim 8, wherein the information comprises address information of a third node on the forwarding path, wherein the method further comprises generating, by triggering based on the address information, a label switched path (LSP) corresponding to the forwarding path, wherein the LSP is used to forward the packet.

10. The method of claim 8, further comprising:
obtaining, from the controller, a second entry comprising a second correspondence between the sequence number and a second cycle time number in which the second network node forwards the packet; and
sending the second entry to the second network node to indicate the second network node to send the packet during a second time period corresponding to the second cycle time number.

11. The method of claim 9, wherein the information is a label stack corresponding to the forwarding path, wherein the label stack comprises a first adjacency segment identifier of the first network node and a second adjacency segment identifier of the second network node, and wherein the label stack indicates to forward the packet through the forwarding path.

12. The method of claim 5, wherein sending the packet to the second network node comprises:
matching the first entry based on the sequence number;
adding the packet to a packet queue corresponding to the first cycle time number; and
sending the packet to the second network node when the packet queue is a sending queue.

13. A controller comprising:
a memory configured to store instructions;
a processor coupled to the memory, wherein the instructions cause the processor to be configured to:

obtain a forwarding latency requirement of a service flow and a destination address of the service flow;

determine, based on the forwarding latency requirement and the destination address, a forwarding path for forwarding the service flow, wherein a first latency of the forwarding path meets the forwarding latency requirement, wherein the forwarding path passes through a first network node and a second network node, wherein the first network node is an ingress node on the forwarding path, and wherein the second network node is an intermediate node on the forwarding path;

determine a first cycle time number in which the first network node forwards a packet and a second cycle time number in which the second network node forwards the packet, wherein the packet is in the service flow;

generate a first entry and a second entry, wherein the first entry comprises a first correspondence between a sequence number of the packet and the first cycle time number, and wherein the second entry comprises a second correspondence between the sequence number and the second cycle time number;

send the first entry to the first network node indicating to send the packet during a first time period corresponding to the first cycle time number; and send the second entry to the second network node indicating to send the packet during a second time period corresponding to the second cycle time number.

14. The controller of claim 13, wherein the instructions to be configured to:

obtain a first node latency of the first network node and a second node latency of the second network node, wherein the first node latency comprises a first packet processing latency and a first packet sending latency of the first network node and wherein the second node latency comprises a second packet processing latency and a second packet sending latency of the second network node; and obtain a link latency of a link on the forwarding path, wherein the latency meets the forwarding latency requirement when a sum of the first node latency, the node latency, and the link latency falls within a range of the forwarding latency requirement.

15. The controller of claim 13, wherein the instructions further cause the processor to be configured to:

obtain a first duration of a first cycle time of the first network node and a second duration of a second cycle time of the second network node;

obtain a third cycle time number of the first network node and a fourth cycle time number of the second network node that correspond to a current time of the controller;

determine the first cycle time number based on the first duration and the third cycle time number;

determine the second cycle time number based on the first duration, a second latency of a link from the first network node to the second network node, a second packet processing latency of the second network node, the fourth cycle time number, and the second duration.

16. The controller of claim 13, wherein the instructions further cause the processor to be configured to:

determine a first adjacent segment identifier of the first network node and a second adjacency segment identifier of the second network node;

generate a label stack comprising the first adjacency segment identifier and the second adjacency segment identifier; and send the label to the first network node indicating to forward the packet through the forwarding path.

17. A first network node comprising:

a memory configured to store instructions;

a processor coupled to the memory, wherein the instructions cause the processor to be configured to:

obtain a forwarding latency requirement of a service flow and a destination address of the service flow;

obtain, based on the forwarding latency requirement and the destination address, a forwarding path for forwarding the service flow, wherein a first latency of the forwarding path meets the forwarding latency requirement, and wherein the first network node is an ingress node on the forwarding path;

obtain a first entry comprising a first correspondence between a sequence number of a packet and a first cycle time number in which the first network node forwards the packet, and wherein the packet is in the service flow; and send the packet to a second network node based on the first entry during a first time period corresponding to the first cycle time number, wherein the second network node is an intermediate node on the forwarding path.

18. The first network node of claim 17, wherein the instructions further cause the processor to be configured to calculate the forwarding path based on the forwarding latency requirement and the destination address.

19. The first network node of claim 17, wherein the instructions further cause the processor to be configured to:

generate a second entry comprising a second correspondence between the sequence number and a second cycle time number in which the second network node forwards the packet; and send the second entry to the second network node indicating to send the packet during a second time period corresponding to the second cycle time number.

20. The first network node of claim 17, wherein the instructions further cause the processor to be configured to:

send the forwarding latency requirement and the destination address to a controller instructing the controller to determine, based on the forwarding latency requirement and the destination address, the forwarding path and to generate the first entry; and receive, from the controller, the first entry and information about the forwarding path.

* * * * *

UNITED STATES PATENT AND TRADEMARK OFFICE
CERTIFICATE OF CORRECTION

PATENT NO. : 11,394,646 B2
APPLICATION NO. : 17/094529
DATED : July 19, 2022
INVENTOR(S) : Xuesong Geng and Guoyi Chen It is certified that error appears in the above-identified patent and that said Letters Patent is hereby corrected as shown below:

In the Claims

Claim 14, Column 23, Line 31: "instructions to" should read "instructions further cause the processor to"

Claim 14, Column 23, Line 43: "the node" should read "the second node"

Signed and Sealed this
Twentieth Day of September, 2022

Katherine Kelly Vidal
*Director of the United States Patent and Trademark Office*